Patented June 22, 1954

2,681,940

UNITED STATES PATENT OFFICE 2,681,940

FLUORINATED PENTENES

Robert P. Ruh and Arthur F. Gordon, Midland, Mich., assignors to Dow Corning Corporation, Midland, Mich., a corporation of Michigan No Drawing. Application December 26, 1951, Serial No. 263,494

1 Claim. (Cl. 260—653)

This invention relates to a fluorinated pentene.

It is an object of this invention to prepare in an economical manner fluorinated unsaturated aliphatic compounds which are useful as additives to hydraulic fluids and as lubricants.

This invention relates to a linear unsaturated compound having the empirical formula $C_5HCl_5F_4$ and having a boiling point of about 178° C. to 180° C. at 754 mm.

The above novel material may be prepared in several ways. Among these is the reaction of the chlorinated pentene of the formula $$CCl_2=CClCCl_2CHClCCl_3$$

with antimony trifluoride. The reaction is preferably carried out in a glass apparatus at reflux temperature. An alternative method is that of reacting the above pentene with liquid HF to give the compound $CCl_2=CClCF_2CCHClCCl_3$ and thereafter reacting the latter with antimony trifluoride in a metal reactor preferably at a temperature between 45° C. and 100° C.

In both of the above processes the reaction mixture may be washed with dilute HCl and then with water until neutral followed by drying. The desired product is then obtained by distillation. It is believed that the product is a mixture of isomers rather than a single compound.

The compound of this invention is an excellent snuffing agent when added to hydraulic fluids. It is of particular utility in connection with siloxane hydraulic fluids because of its combination of non-inflammability, a low freezing point, and excellent compatibility with the siloxanes. In addition the present compound is a lubricant per se and is an excellent high pressure additive for siloxane lubricants and for organic lubricants.

The following examples is illustrative only and should not be construed as limiting the invention which is properly set forth in the appended claim.

EXAMPLE 761 grams of $CCl_2=CClCCl_2CHClCCl_3$ were refluxed with 720 grams of $SbF_3$ in a glass flask for 1½ hours with stirring. 1 liter of 17 per cent aqueous HCl was then added and the product was steam distilled. The distillate was washed with dilute HCl and then with water until neutral. It was dried over calcium sulfate. 411 grams of product was obtained which was then distilled to give 300 grams of a product boiling 178° C. to 180° C. at 754 mm. This material had the empirical formula $C_5HCl_5F_4$ and a density at 25° C. of 1.694 and a refractive index at 25° C. of 1.4498. Upon analysis the product was found to contain 56.75 per cent Cl, 24.1 per cent F, 18.93 per cent C, and 0.48 per cent H. It solidified at about −79° C. Freezing point curves indicate that the material was a mixture of isomers.

That which is claimed is:

An unsaturated linear compound having the empirical formula $C_5HCl_5F_4$ and having a boiling range of about 178° C. to 180° C. at 754 mm.

No references cited.